US010520797B2

United States Patent
Yamamoto et al.

(10) Patent No.: US 10,520,797 B2
(45) Date of Patent: Dec. 31, 2019

(54) PROJECTION SYSTEM, CONTROL DEVICE, AND CONTROL METHOD OF PROJECTION SYSTEM

(71) Applicant: SEIKO EPSON CORPORATION, Tokyo (JP)

(72) Inventors: Takekuni Yamamoto, Matsumoto (JP); Takashi Nagumo, Yamagata-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/706,239

(22) Filed: Sep. 15, 2017

(65) Prior Publication Data

US 2018/0084234 A1 Mar. 22, 2018

(30) Foreign Application Priority Data

Sep. 21, 2016 (JP) ................... 2016-183711

(51) Int. Cl.
| | |
|---|---|
| *G03B 21/00* | (2006.01) |
| *G03B 21/13* | (2006.01) |
| *G03B 21/14* | (2006.01) |
| *G03B 21/20* | (2006.01) |
| *G06F 3/14* | (2006.01) |

(Continued)

(52) U.S. Cl.
CPC ............ *G03B 21/00* (2013.01); *G03B 21/13* (2013.01); *G03B 21/14* (2013.01); *G03B 21/2013* (2013.01); *G06F 3/1446* (2013.01); *G09G 5/006* (2013.01); *G09G 5/12* (2013.01); *H04N 9/3147* (2013.01); *H04N 9/3155* (2013.01); *H04N 21/4122* (2013.01); *H04N 21/43635* (2013.01); *G09G 2350/00* (2013.01);

(Continued)

(58) Field of Classification Search
CPC ............... H04N 9/3147; H04N 9/3155; H04N 21/4122; H04N 21/43635; H04N 5/74; G06F 3/1446; G03B 21/00; G03B 21/13; G03B 21/14; G03B 21/2013; G02F 1/1347; G09G 5/00; G09G 5/377; G09G 5/38; G09G 5/006; G09G 5/12; G09G 2350/00; G09G 2356/00; G09G 2370/022; G09G 2370/12
See application file for complete search history.

(56) References Cited

U.S. PATENT DOCUMENTS

| | | |
|---|---|---|
| 2010/0171930 A1 | 7/2010 | Kurosawa |
| 2011/0141236 A1 | 6/2011 | Mitani et al. |

(Continued)

FOREIGN PATENT DOCUMENTS

| | | |
|---|---|---|
| JP | 2008-216805 A | 9/2008 |
| JP | 2010-088092 A | 4/2010 |

(Continued)

*Primary Examiner* — Cara E Rakowski
*Assistant Examiner* — Magda Cruz
(74) *Attorney, Agent, or Firm* — Oliff PLC

(57) ABSTRACT

A projector system includes a plurality of projectors, in which a projector A and a projector B, and the projector B and a projector C are connected by a daisy chain method via each of cables, and the projector A outputs control information which controls the projector B or the projector C to the projector B via a data line of the cable along with image data and the projector B extracts and processes the control information input from the data line of the cable.

12 Claims, 4 Drawing Sheets

(51) Int. Cl.
  *H04N 9/31* (2006.01)
  *H04N 21/41* (2011.01)
  *H04N 21/4363* (2011.01)
  *G09G 5/00* (2006.01)
  *G09G 5/12* (2006.01)

(52) U.S. Cl.
  CPC ... *G09G 2356/00* (2013.01); *G09G 2370/022* (2013.01); *G09G 2370/12* (2013.01)

(56) References Cited

U.S. PATENT DOCUMENTS

| | | | |
|---|---|---|---|
| 2011/0157310 A1 | 6/2011 | Mitani et al. | |
| 2011/0254876 A1 | 10/2011 | Yokoyama | |
| 2013/0061271 A1* | 3/2013 | Lu | H04L 12/2838 |
| | | | 725/74 |
| 2013/0141475 A1 | 6/2013 | Kotani | |
| 2013/0181884 A1* | 7/2013 | Perkins | H04N 9/3147 |
| | | | 345/1.3 |
| 2013/0295984 A1* | 11/2013 | Todoroki | H04B 7/0452 |
| | | | 455/550.1 |
| 2014/0037206 A1 | 2/2014 | Newton et al. | |
| 2015/0237317 A1* | 8/2015 | Ehara | H04N 9/3185 |
| | | | 348/745 |
| 2016/0119507 A1* | 4/2016 | Duyvejonck | H04N 9/3147 |
| | | | 348/512 |
| 2017/0084246 A1* | 3/2017 | Joshi | G06F 3/1446 |
| 2017/0332148 A1* | 11/2017 | Fullerton | H04L 67/1097 |
| 2017/0339379 A1* | 11/2017 | Tanaka | H04N 9/3147 |

FOREIGN PATENT DOCUMENTS

| | | |
|---|---|---|
| JP | 2010-160270 A | 7/2010 |
| JP | 2011-227303 A | 11/2011 |
| JP | 2012-212061 A | 11/2012 |
| JP | 2013-117631 A | 6/2013 |
| JP | 2014-519221 A | 8/2014 |
| JP | 2015-008372 A | 1/2015 |
| JP | 2015-169940 A | 9/2015 |
| JP | 2016-014720 A | 1/2016 |

* cited by examiner

PROJECTION SYSTEM, CONTROL DEVICE, AND CONTROL METHOD OF PROJECTION SYSTEM

CROSS-REFERENCE

The entire disclosure of Japanese Patent Application No. 2016-183711, filed Sep. 21, 2016 is expressly incorporated by reference herein.

BACKGROUND

1. Technical Field

The present invention relates to a projection system, a control device, and a control method of a projection system.

2. Related Art

In the related art, a projection system in which a plurality of projectors are connected by a cable and an image is projected by the connected plurality of projectors is known (see, for example, JP-A-2008-216805).

JP-A-2008-216805 discloses an image projection system in which a plurality of projectors are connected by a so-called daisy chain method by a cable for image transmission and a cable for command transmission.

However, in the image projection system of JP-A-2008-216805, since the plurality of projectors are connected to each other using a plurality of cables, each of the projectors must have a plurality of interfaces for cable connection. For this reason, a configuration of each of the projectors becomes complicated and becomes large. In addition, since the projectors are connected to each other using the plurality of cables, an installation state becomes very unsightly.

SUMMARY

An advantage of some aspects of the invention is to realize a simple connection configuration and operate a plurality of projectors by control of a control device.

An aspect of the invention is directed to a projection system including a control device and at least one projector, in which the control device and the projector or the control device and the projector, and each of the projectors are connected by a daisy chain method via a cable, the cable has a data line which transmits image data, the control device outputs control information which controls the projector to the projector via the data line along with the image data, and the projector extracts and processes the control information input from the data line of the cable.

According to the aspect of the invention, the control device may output control information to the projector by a data line which transmits image data. Accordingly, even if there is a simple connection configuration in which the control device and the projector or the control device and the projector, and each of the projectors are connected by a cable, the image data and the control information may be transmitted from the control device to the projector.

In the aspect of invention, the projector located at an end among the projectors connected to the control device by a daisy chain method and the control device may be connected with each other by a loop cable.

According to the aspect of invention with this configuration, since the projector located at an end and the control device are connected via the loop cable, for example, information may be output from the projector located at the end to the control device and information may be output from the projector to the projector located at the end.

In the aspect of invention, the loop cable may have a data line which transmits image data, the projector located at an end among the projectors may output the control information to the data line of the loop cable, and the control device may extract and process the control information input from the data line of the loop cable.

According to the aspect of invention with this configuration, the projector located at an end may output the control information to the control device via the data line of the loop cable. Accordingly, the image data and the control information may be output from the projector located at the end to the control device via the loop cable.

In the aspect of invention, the projection system may further include a plurality of the projectors, in which identification information which identifies the projector may be set to each of the projectors, the control device may output the control information to the cable along with identification information of the destination projector, and the projector may execute a process corresponding to the control information including the set identification information among the control information input from the cable and outputs result information indicating a result of the executed process to the data line of the cable.

According to the aspect of invention with this configuration, among the control information input from the cable, the projector executes a process corresponding to the control information including the set identification information and outputs result information indicating a result of the executed process to the data line of the cable. Accordingly, the process may be executed by the projector according to control information output by the control device.

In the aspect of invention, the projector located at the end may output the result information output to the cable by the other projector to the data line of the loop cable.

According to the aspect of invention with this configuration, the projector located at the end may output result information indicating a result of the process corresponding to the control information to the control device.

In the aspect of invention, the projector located at the end may output low volume image data with reduced data amount of the image data input from the cable and the result information to the data line of the loop cable.

According to the aspect of invention with this configuration, the projector located at the end outputs low volume image data with reduced data amount of the image data and the result information to the data line of the loop cable. Accordingly, the low volume image data and the result information may be reliably transmitted to the control device by reducing a probability that a transmission error or the like occurs in the loop cable.

In the aspect of invention, the projection system may further include one projector, in which identification information which identifies the projector may be set to the projector, the control device may output the control information to the cable along with identification information of the projector, and the projector may execute a process corresponding to the control information input from the cable and outputs result information indicating a result of the executed process to the data line of the loop cable.

According to the aspect of invention with this configuration, the projector executes a process corresponding to the control information and outputs result information indicating a result of the executed process to the data line of the cable. Accordingly, the process may be executed by the projector according to control information output by the control device.

In the aspect of invention, the projector may output low volume image data with reduced data amount of the image data input from the cable and the result information to the data line of the loop cable.

According to the aspect of invention with this configuration, the projector outputs low volume image data with reduced data amount of the image data and the result information to the data line of the loop cable. Accordingly, the low volume image data and the result information may be reliably transmitted to the control device by reducing a probability that a transmission error or the like occurs in the loop cable.

In the aspect of invention, the cable may be an HDMI (registered trademark) cable, and the control device and the projector may output the control information included in an info-frame of an HDMI protocol to the data line.

According to the aspect of invention with this configuration, the control information is included in the info-frame of the HDMI protocol and output to the data line. Accordingly, the control device and the projector may transmit the control information by the data line of the HDMI cable without changing the existing HDMI protocol.

In the aspect of invention, a tiling image may be projected by superimposing images projected by a plurality of the projectors on a projection surface, and the control information output by the control device may include at least one of setting information for setting a position of an image projected by each of the projectors for the tiling image and setting information related to an edge blending process to an overlapping area in which the images are overlapped each other for the tiling image.

According to the aspect of invention with this configuration, the control device outputs a setting of the position of the image to be projected by the projector or a setting related to an edge blending process to the overlapping area in which the images are overlapped each other to the data line of the cable as the control information. Accordingly, the projector may set a position of an image to be projected and can perform a setting related to an edge blending process by extracting control information input from the data line of the cable.

In the aspect of invention, the control device may be a projector which projects an image.

According to the aspect of invention with this configuration, the projector of the projection system may be operated as a control device without separately preparing a device operated as the control device.

Another aspect of the invention is directed to a control device constituting a projection system along with at least one projector, in which the control device and the projector or the control device and the projector, and each of the projectors are connected by a daisy chain method via a cable having a data line which transmits image data, the control device includes: a transmitter which outputs control information which controls the projector to the projector via the data line along with the image data.

According to the aspect of invention, the control device may output control information to the projector by a data line which transmits image data. Accordingly, even if there is a simple connection configuration in which the control device and the projector or the control device and the projector, and each of the projectors are connected by a cable, the image data and the control information may be transmitted from the control device to the projector.

Still another aspect of the invention is directed to a control method of a projection system including a control device and at least one projector, in which the control device and the projector or the control device and the projector, and each of the projectors are connected by a daisy chain method via a cable, the cable has a data line which transmits image data, the control device outputs control information which controls the projector to the projector via the data line along with the image data, and the projector extracts and processes the control information input from the data line of the cable.

According to the aspect of invention, the control device may output control information to the projector by a data line which transmits image data. Accordingly, even if there is a simple connection configuration in which the control device and the projector or the control device and the projector, and each of the projectors are connected by a cable, the image data and the control information may be transmitted from the control device to the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to accompanying drawings.

Figure 1:
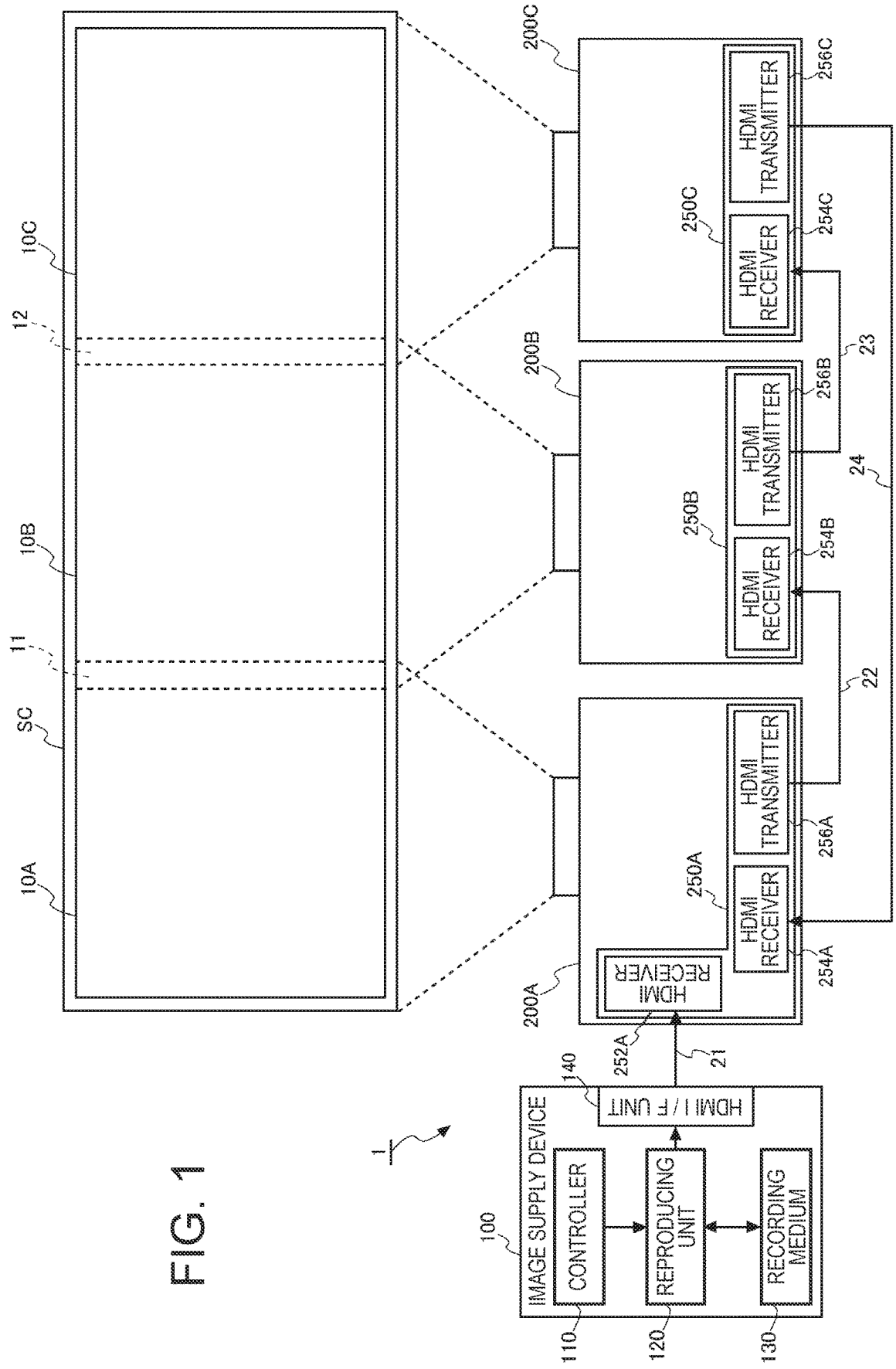
FIG. 1 is a system configuration diagram schematically illustrating a projection system.

FIG. 1 is a system configuration diagram of the embodiment to which the invention is applied.

A projection system 1 of the present embodiment includes an image supply device 100 and a plurality of projectors 200. In FIG. 1, three the projectors 200 of projectors 200A, 200B, and 200C are illustrated as the plurality of projectors 200, but the number of the projectors 200 is not limited to three. The projection system 1 may include at least one projector 200 as a master machine and one projector 200 as a slave machine. A master machine and a slave machine will be described below.

The image supply device 100 is connected to the projector 200 operating as a master machine and supplies an HDMI (registered trademark) signal to the projector 200 of a master machine. In the HDMI signal, at least image data is included and audio data may be included in addition to the image data. In addition, the image data may be image data of a moving image and may be image data of a still image.

In the present embodiment, the projector 200A is connected to the image supply device 100 and operates as a master machine. The projector 200A operates as "control device" according to the invention. The projector 200A which is a master machine transmits the HDMI signal received from the image supply device 100 to the projector 200B or 200C operating as a slave machine. In addition, the projector 200A transmits a control signal to the projector 200B or 200C and controls operation of the projector 200B or 200C. The projectors 200B and 200C which are slave machines operate according to control of the projector 200A.

The image supply device 100 includes a controller 110, a reproducing unit 120, a recording medium 130, and an HDMI interface (hereinafter, interface is abbreviated as I/F) unit 140. The HDMI I/F unit 140 corresponds to "transmitter" according to the invention.

The controller 110 controls the image supply device 100. The reproducing unit 120 plays contents recorded in the recording medium 130 such as DVD, Blu-ray (registered trademark), or the like by control of the controller 110. In addition, the reproducing unit 120 outputs image data or audio data of the played contents to the HDMI I/F unit 140.

The HDMI I/F unit 140 is connected to an HDMI cable 21. One end tip of the HDMI cable 21 is connected to the HDMI I/F unit 140 and the other end tip of the HDMI cable 21 is connected to an HDMI I/F unit 250A of the projector 200A. Based on control of the controller 110, the HDMI I/F unit 140 converts input image data and audio data into an HDMI signal of a predetermined transmission format. Based on control of the controller 110, the HDMI I/F unit 140 outputs the HDMI signal to the HDMI cable 21.

The reproducing unit 120 may play content stored in a semiconductor storage device such as a flash memory, a magnetic storage device such as an HDD, or a magneto-optical storage device. In addition, content downloaded from a server device on a network may be played by the reproducing unit 120. Further, the contents played by the reproducing unit 120 may be image data of a moving image or a still image which does not include audio data, and may be a slide video generated by presentation software.

For example, a notebook Personal Computer (PC), a desktop PC, a tablet terminal, a smartphone, a Personal Digital Assistant (PDA), or the like can be used as the image supply device 100. In addition, a video play device, a Digital Versatile Disk (DVD) player, a Blu-ray disk player, a hard disk recorder, a TV tuner device, a set top box of Cable television (CATV), a video game machine, or the like may be used as the image supply device 100.

The projectors 200A, 200B, and 200C are connected to each other by a daisy chain method by HDMI cables 22 and 23. The projector 200B is connected to the projector 200A via the HDMI cable 22. The projector 200C is connected to the projector 200B via the HDMI cable 23. The projector 200C corresponds to "projector located at an end" according to the invention. In addition, the projector 200A which is a master machine and the projector 200C located at the end are connected with each other by an HDMI cable 24. The HDMI cable 24 corresponds to "loop cable" according to the invention.

The projector 200A includes the HDMI I/F unit 250A. The HDMI I/F unit 250A includes HDMI receivers 252A and 254A and an HDMI transmitter 256A. The HDMI receiver 252A is connected to the image supply device 100 by the HDMI cable 21. The HDMI receiver 254A is connected to the projector 200C by the HDMI cable 24. In addition, the HDMI transmitter 256A is connected to the projector 200B by the HDMI cable 22.

The projector 200A receives the HDMI signal transmitted from the image supply device 100 by the HDMI receiver 252A. The projector 200A accepts the received HDMI signal and processes the HDMI signal by an image processing unit 260A (see FIG. 2) in the projector 200A. In addition, the projector 200A transmits the HDMI signal to the projector 200B by the HDMI transmitter 256A. Further, the projector 200A receives the HDMI signal transmitted from the projector 200C by the HDMI receiver 254A.

The projector 200B includes an HDMI I/F unit 250B. The HDMI I/F unit 250B includes an HDMI receiver 254B and an HDMI transmitter 256B. The HDMI receiver 254B is connected to the projector 200A by the HDMI cable 22. The HDMI transmitter 256B is connected to the projector 200C by the HDMI cable 23.

The projector 200B receives the HDMI signal transmitted from the projector 200A by the HDMI receiver 254B. The projector 200B accepts the received HDMI signal and processes the HDMI signal by an image processing unit 260B (not illustrated) in the projector 200B. In addition, the projector 200B transmits the HDMI signal to the projector 200C by the HDMI transmitter 256B.

The projector 200C includes an HDMI I/F unit 250C. The HDMI I/F unit 250C includes an HDMI receiver 254C and an HDMI transmitter 256C. The HDMI receiver 254C is connected to the projector 200B by the HDMI cable 23. The HDMI transmitter 256C is connected to the projector 200A by the HDMI cable 24.

The projector 200C receives the HDMI signal transmitted from the projector 200B by the HDMI receiver 254C. The projector 200C accepts the received HDMI signal and processes the HDMI signal by an image processing unit 260C (not illustrated) in the projector 200C. In addition, the projector 200C transmits the HDMI signal to the projector 200A by the HDMI transmitter 256C.

The HDMI cables 21, 22, 23, and 24 have data lines for transmission of image data, audio data, or control information. This data line is three data lines of Transition Minimized Differential Signaling (TMDS) channels #0, #1, and #2. These data lines are data lines for serially transmitting the HDMI signal in one direction. Three data lines of TMDS channels #0, #1, and #2 correspond to "data line transmitting image data" according to the invention. In addition, beside that, the HDMI cables 21, 22, 23, and 24 have a Consumer Electronics Control (CEC) line and a Display Data Channel (DDC) line. A CEC line is a signal line for bidirectionally communicating control data between equipment connected to an HDMI cable. A DDC line is two signal lines used for reading Enhanced Extended Display Identification Data (E-EDID). E-EDID is device information for specifying sink equipment which is a device on a side receiving supply of the HDMI signal. Between the image supply device 100 and the projector 200A connected to the HDMI cable 21, the projector 200A corresponds to sink equipment. Between the projector 200A and the projector 200B connected to the HDMI cable 22, the projector 200B corresponds to sink equipment. Between the projector 200B and the projector 200C connected to the HDMI cable 23, the projector 200C corresponds to sink equipment. Between the projector 200C and the projector 200A connected to the HDMI cable 24, the projector 200A corresponds to sink equipment.

FIG. 1 illustrates a case where the projectors 200A, 200B, and 200C are disposed in a row in a horizontal direction and each of the projectors 200 projects images side by side on a screen SC. The projector 200A projects images to a projection area 10A of the screen SC, the projector 200B projects images to a projection area 10B of the screen SC, and the projector 200C projects images to a projection area 10C of the screen SC. The screen SC corresponds to "projection surface" according to the invention.

The projection system 1 combines images projected by the projectors 200A, 200B, and 200C and performs a tiling projection to project an image of one large screen on the screen SC. In the tiling projection, the projector 200 projects the images so that an edge of the image projected by one projector 200 overlaps an edge of the image projected by the adjacent projector 200. This is to ensure that a boundary of the projected images is inconspicuous. For example, an edge of an image projected by the projector 200A and an edge of an image projected by the projector 200B located on a right side thereof overlap with each other and form an overlapping area 11. In the same manner, the edge of the image projected by the projector 200B and an edge of an image projected by the projector 200C located on a right side thereof overlap with each other and form an overlapping area 12.

In addition, in the present embodiment, a case where a projection target to which the projectors 200A, 200B, and 200C project images is the screen SC is described, but the projection target is not limited to the screen SC. The projection target may be a uniform plane, a curved surface, a discontinuous surface, or a surface having unevenness. Specifically, a wall surface of a building or a surface of an object can be projected.

In addition, an installation method of the projectors 200A, 200B, and 200C is not limited to flat placement, but the projectors 200A, 200B, and 200C also may be suspended and installed from a ceiling, or hung and installed on a wall.

Further, FIG. 1 illustrates a case where the projectors 200A, 200B, and 200C are disposed side by side in a row, but in a case of a configuration in which four projectors 200 are connected, four projectors 200 can be disposed in two rows and two columns side by side.

Figure 2:
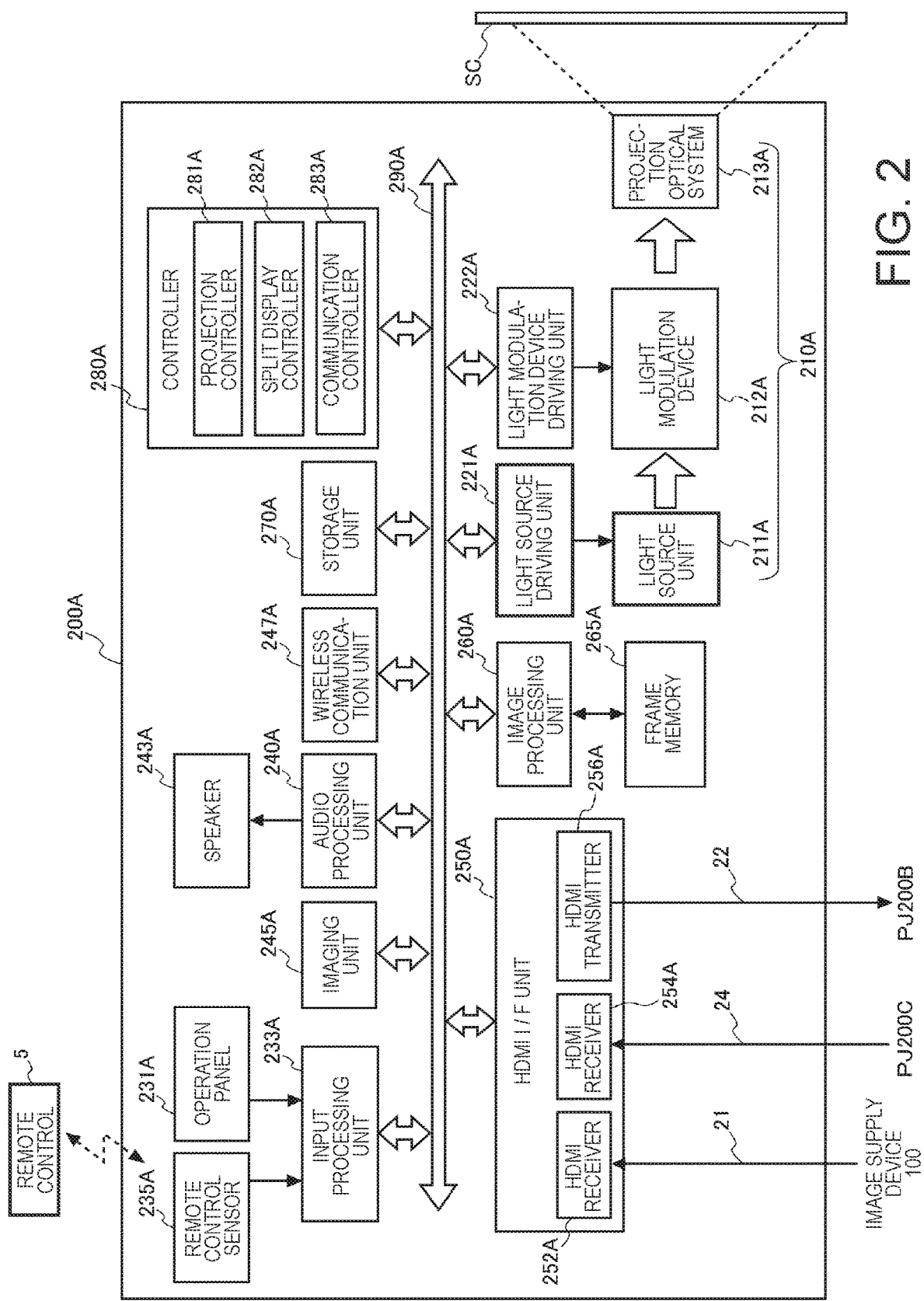
FIG. 2 is a configuration diagram illustrating a configuration of a projector.

FIG. 2 is a configuration diagram illustrating a configuration of the projector 200A. A configuration of the projector 200A is different from configurations of the projectors 200B and 200C in that the HDMI I/F unit 250A includes two HDMI receivers 252A and 254A. However, since other configurations are common to the projectors 200A, 200B, and 200C, the configuration of the projector 200A will be described as a representative.

In addition, in the following description, a function block of the projector 200A is denoted by a sign of "A", a function block of the projector 200B is denoted a sign of "B", and a function block of the projector 200C is denoted a sign of "C". This is to distinguish the function block of the projector 200B having the same name as the function block of the projector 200A from the function block of the projector 200C of the same name. For example, a controller of the projector 200A is referred to as a controller 280A, a controller of the projector 200B is referred to as a controller 280B, and a controller of the projector 200C is referred to as a controller 280C.

The HDMI I/F unit 250A of the projector 200A includes the HDMI receivers 252A and 254A and the HDMI transmitter 256A.

The HDMI receivers 252A and 254A respectively includes a connecting terminal connected to each of the HDMI cables 21 and 24 and an interface circuit processing the received HDMI signal and converting image data or audio data to control information.

In addition, the HDMI transmitter 256A includes a connecting terminal connected with the HDMI cable 22 and an interface circuit converting image data, audio data, and control information to an HDMI signal.

The projector 200A includes a display unit 210A which forms an optical image and projects the image on the screen SC. The display unit 210A includes a light source unit 211A, a light modulation device 212A, and a projection optical system 213A.

The light source unit 211A includes a light source including a xenon lamp, an extra-high pressure mercury lamp, a Light Emitting Diode (LED), a laser light source, and the like. In addition, the light source unit 211A may include a reflector and an auxiliary reflector for guiding light emitted from a light source to the light modulation device 212A. Further, the light source unit 211A may include a lens group and a polarizing plate for enhancing optical characteristics of the projected light and a dimming element or the like (neither illustrated) for reducing amount of light emitted from the light source on a path leading to the light modulation device 212A.

The light source unit 211A is driven by a light source driving unit 221A. The light source driving unit 221A is connected to an internal bus 290A and turns on and off a light source of the light source unit 211A under control of the controller 280A also connected to the same internal bus 290A.

The light modulation device 212A includes, for example, three liquid crystal panels corresponding to three primary colors of RGB. Light emitted from the light source unit 211A is separated into three colors of light of RGB and three pieces of color light are respectively incident on corresponding liquid crystal panels. Three liquid crystal panels are transmission-type liquid crystal panels and generate image light by modulating the transmitted light. The image light modulated by passing through each of the liquid crystal panels is synthesized by a synthetic optical system such as a cross dichroic prism and is emitted to the projection optical system 213A.

The light modulation device 212A is driven by a light modulation device driving unit 222A. The light modulation device driving unit 222A is connected to the internal bus 290A.

Image data corresponding to each of primary colors of R, G, and B is input to the light modulation device driving unit 222A from the image processing unit 260A. The light modulation device driving unit 222A converts the input image data into a data signal suitable for operation of the liquid crystal panel. Based on the converted data signal, the light modulation device driving unit 222A applies a voltage to each of pixels of each of liquid crystal panels and draws an image on each of the liquid crystal panels.

The projection optical system 213A includes a lens group which projects the image light modulated by the light modulation device 212A to the screen SC and forms an image on the screen SC. In addition, the projection optical system 213A may include a zoom mechanism which enlarges or reduces the image projected on the screen SC, and a focus adjustment mechanism which adjusts a focus.

The projector 200A includes an operation panel 231A, a remote control sensor 235A, and an input processing unit 233A. The operation panel 231A and the remote control sensor 235A are connected to the input processing unit 233A connected with the internal bus 290A.

The operation panel 231A is provided with various operation keys for operating the projector 200A. The operation panel 231A is provided with, for example, a power key for instructing power-on or power-off of the projector 200A, a menu key for performing various settings, and the like. When the operation key is operated, the input processing unit 233A outputs an operation signal corresponding to the operated key to a controller 280.

In addition, the projector 200A has a remote control 5 used by a user. The remote control 5 includes various buttons and transmits infrared signals corresponding to operation of these buttons.

The remote control sensor 235A receives the infrared signal transmitted from the remote control 5. The input processing unit 233A decodes the infrared signal received by the remote control sensor 235A, generates an operation signal indicating operation contents in the remote control 5, and outputs the operation signal to the controller 280A.

The projector 200A includes an audio processing unit 240A and a speaker 243A.

The audio processing unit 240A performs a signal process such as decoding, D/A conversion, amplification, or the like to audio data, converts the audio data into an analog audio signal, and outputs the audio signal to the speaker 243A.

The projector 200A includes an imaging unit 245A.

The imaging unit 245A includes a camera having an imaging optical system, an imaging device, an interface circuit, and the like and generates captured image data according to control of the controller 280A. The imaging unit 245A outputs the generated captured-image data to the controller 280A.

The projector 200A includes a wireless communication unit 247A. The wireless communication unit 247A is connected to the internal bus 290A and is operated according to control of the controller 280A.

The wireless communication unit 247A includes an antenna (not illustrated), a Radio Frequency (RF) circuit, and the like and executes wireless communication with an external device under control of the controller 280A. For example, a short distance wireless communication system such as a wireless Local Area Network (LAN), a Bluetooth (registered trademark), an Ultra Wide Band (UWB), infrared communication, and the like can be adopted as a wireless communication method of the wireless communication unit 247A. In addition, a wireless communication method using a cellular phone line can be adopted as the wireless communication method of the wireless communication unit 247A.

The projector 200A includes an image processing system. This image processing system is mainly configured with the controller 280A which integrally controls an overall of the projector 200A and further includes the image processing unit 260A, a frame memory 265A, and a storage unit 270A. The controller 280A, the image processing unit 260A, and the storage unit 270A are connected to each other so as to enable data communication by the internal bus 290A.

The image processing unit 260A processes the image data by developing the image data received from the image supply device 100 into the frame memory 265A. The process performed by the image processing unit 260A includes, for example, a resolution conversion (scaling) process or a resizing process, a shape correction process such as distortion correction, a digital zoom process, a color tone correction process, a luminance correction process, and the like. The image processing unit 260A executes a process designated by the controller 280A and performs the process using a parameter input by the controller 280A as necessary. In addition, the image processing unit 260A can also execute a combination of a plurality of processes described above. The image processing unit 260A reads image data of which a process is ended from the frame memory 265A and outputs the image data to the light modulation device driving unit 222A.

The storage unit 270A is, for example, an auxiliary storage device such as a hard disk device. The storage unit 270A may be replaced with a Dynamic RAM (DRAM) and a flash memory capable of storing mass information or an optical disk such as a Compact Disc (CD), a Digital Versatile Disc (DVD), a Blu-ray Disc (BD), or the like. The storage unit 270A stores a control program or various types of data executed by the controller 280A. In addition, the storage unit 270A stores identification information of the projectors 200A, 200B, and 200C connected to each other by a daisy chain method. The same applies to storage units 270B and 270C. The identification information of each of the projectors 200 may be input by a user operating the operation panel 231A and may be device information read from E-EDID via a DDC line. Device information of the projector 200B may be directly read from the projector 200B by the projector 200A and device information of the projector 200C read by the projector 200B may be transmitted to the projector 200A, for example, via a CEC line.

The controller 280A includes a CPU, a ROM, and a RAM (neither illustrated) as hardware. The ROM is a nonvolatile storage device such as a flash ROM and stores a control program and data. The RAM constitutes a work area of the CPU. The CPU develops the control program read from the ROM in the RAM, executes the developed control program, and controls each of units of the projector 200A.

The controller 280A includes a projection controller 281A, a split display controller 282A, and a communication controller 283A as function blocks. These function blocks are realized by executing the control program developed in the RAM.

The projection controller 281A controls each of units of the projector 200A to display images on the screen SC. Specifically, the projection controller 281A causes the image processing unit 260A to process image data. At this time, the projection controller 281A may read a parameter necessary for a process of the image processing unit 260A from the storage unit 270A and may output the parameter to the image processing unit 260A.

In addition, the projection controller 281A controls the light modulation device driving unit 222A to draw images on a liquid crystal panel of the light modulation device 212A. Further, the projection controller 281A controls the light source driving unit 221A to turn on a light source of the light source unit 211A and adjust luminance of the light source. Accordingly, image light emitted from the light source and modulated by the light modulation device 212A is projected onto the screen SC by the projection optical system 213A.

In a case where a tiling projection is performed, the split display controller 282A sets an area of image data displayed on each of the projectors 200 for the image data received from the image supply device 100. First, the split display controller 282A detects projection areas of the projectors 200A, 200B, and 200C. For example, the split display controller 282A causes the projectors 200A, 200B, and 200C to project preset projection images one by one. For example, a full black image can be used as the preset projection image so as to distinguish the projection areas 10A, 10B, and 10C of each of the projectors 200.

In a case where projection of the preset projection image is instructed to the projector 200B, the split display controller 282A transmits a command to instruct projection to the projector 200B via a data line of CEC included in the HDMI cable 22. In addition, in a case where projection of a projection image is instructed to the projector 200C, the split display controller 282A transmits a command to instruct projection to the projector 200B and causes the projector 200B to relay transmission of the command to the projector 200C.

Further, a user may operate the projector 200B and may cause the projector 200B to project the preset projection image. In a case where the projector 200B receives operation indicating that a projection image is projected on the projection area 10B by the operation panel 231A or the remote control 5, the split display controller 282A causes the imaging unit 245A to generate captured image data. The same applies to the projector 200C. The user may operate the projector 200C and may cause the projector 200C to project the preset projection image. In a case where the projector 200C receives operation indicating that a projection image is projected on the projection area 10C by the operation panel 231A or the remote control 5, the split display controller 282A causes the imaging unit 245A to generate captured image data.

When a projection image is projected on the projection area 10A, the split display controller 282A causes the imaging unit 245A to generate captured image data. In the same manner, when a projection image is projected on the projection area 10B, the split display controller 282A causes the imaging unit 245A to generate captured image data and when a projection image is projected on the projection area 10C, the split display controller 282A causes the imaging unit 245A to generate captured image data.

The split display controller 282A obtains the captured image data from the imaging unit 245A and generates information (hereinafter, referred to as "projection range information") indicating a position or a range of each of the projection areas 10A, 10B, and 10C on the screen SC based on the obtained captured image data. The split display controller 282A causes the storage unit 270A to store projection range information of each of the projection areas 10A, 10B, and 10C in association with identification information of the corresponding projector 200.

In addition, based on the generated projection range information, the split display controller 282A detects an overlapping area of the projection area 10A and the projection area 10B and sets the detected area as the overlapping area 11. In the same manner, based on the projection range information, the split display controller 282A detects an overlapping area of the projection area 10B and the projection area 10C and sets the detected area as the overlapping area 12. The split display controller 282A causes the storage unit 270A to store information (hereinafter, referred to as "overlap range information") indicating ranges of the set overlapping areas 11 and 12.

In addition, based on the generated projection range information, the split display controller 282A sets a range of image data to be projected by each of the projectors 200. The split display controller 282A causes the storage unit 270A to store information (hereinafter, referred to as "image range information") indicating a range of the set image data. The image range information corresponds to "information for setting a position of an image projected by a projector" according to the invention.

In addition, based on the generated overlap range information, the split display controller 282A sets a range within which an edge blending process is performed and generates a parameter used for the edge blending process executed in the set range. For example, the parameter includes a parameter indicating a start position of decrease at which a pixel value of image data decreases, a parameter indicating a width from the start position of decrease to an end position of decrease of the pixel value, and the like. The split display controller 282A causes the storage unit 270A to store the generated parameter. The parameter corresponds to "setting information on an edge blending process" according to the invention.

In the above description, a case where image range information and the like is generated by control of the split display controller 282A is described, but a user may operate the operation panel 231A and projection range information, overlap range information, image range information, and the like may be generated according to operation of the operation panel 231A.

The communication controller 283A controls the HDMI I/F unit 250A to control communication with the image supply device 100 and communication with the projectors 200B and 200C.

In addition, the communication controller 283A reads image range information, a parameter, and the like from the storage unit 270A and controls the HDMI I/F unit 250A to transmit the image range information, the parameter, and the like to the projector 200B or the projector 200C. More specifically, the communication controller 283A generates an info-frame including control information such as image range information, a parameter, and the like read from the storage unit 270A and identification information of the projector 200 indicating a destination of the control information. The communication controller 283A controls the HDMI I/F unit 250A to transmit an HDMI signal to which the info-frame is attached to the projector 200B in a blanking period during which transmission of image data supplied from the image supply device 100 is interrupted. The info-frame is transmitted using three data lines of TMDS channels #0, #1, and #2 used for transmitting image data or audio data. The blanking period includes a vertical blanking period and a horizontal blanking period. The vertical blanking period is a period from an end of output of one frame of image data to a start of output of the next frame of the image data. In addition, the horizontal blanking period is a period from an end of output of one line of image data to a start of output of the next line of the image data.

In addition, in a case where control information cannot be transmitted in one info-frame, the communication controller 283A divides and inserts the control information into a plurality of info-frames and transmits the info-frames including the control information to the projector 200B a plurality of times. In addition, in a case where transmission cannot be performed with an HDMI signal in one blanking period, the HDMI transmitter 256A divides the blanking period into a plurality of blanking periods and transmits the info-frames to the projector 200B a plurality of times.

When the HDMI signal is received from the projector 200A, the controller 280B of the projector 200B converts the received HDMI signal and extracts image data, audio data, and control information. In a case where the received HDMI signal includes control information, the controller 280B extracts and processes the control information. First, based on identification information of the projector 200 indicating a destination, the controller 280B determines whether the destination of the control information is the projector 200B or the projector 200C. In a case where the destination of the control information is the projector 200B, the controller 280B processes image data received from the projector 200A based on the control information. In addition, in a case where the destination of the control information is the projector 200C, the controller 280B generates an info-frame including the control information, adds the info-frame to an HDMI signal of a blanking period of image data, and transmits the HDMI signal to the projector 200C.

Further, when control information addressed to the projector 200B is received, the controller 280B determines whether or not a drop, an error, and the like occur in the received control information. In a case where it is determined that a drop, an error, and the like occur in the received control information, the controller 280B generates control information including information (hereinafter, referred to as error information) indicating that an error or a drop occurs in the control information and identification information of the projector 200B. In addition, the controller 280B generates an info-frame including the generated control information and identification information of the projector 200A indicating a destination of the control information. The controller 280B adds the generated info-frame to an HDMI signal of a blanking period of image data and transmits the HDMI signal to the projector 200C. The error information corresponds to "result information" according to the invention.

When the HDMI signal is received from the projector 200B, the controller 280C of the projector 200C located at an end of the daisy chain connected projectors converts the received HDMI signal and extracts image data, audio data, and control information. In a case where the received HDMI signal includes control information, the controller 280C extracts and processes the control information. First, based on identification information of the projector 200 indicating a destination, the controller 280C determines whether or not the destination of the control information is the projector 200C. In a case where the destination of the control information is the projector 200C, the controller 280C processes image data received from the projector 200B based on the control information. In addition, in a case where the destination of the control information is the projector 200A, the controller 280C generates an info-frame including the control information, adds the info-frame to an HDMI signal of a blanking period of image data, and transmits the HDMI signal to the projector 200A.

Further, when control information addressed to the projector 200C is received, the controller 280C determines whether or not a drop, an error, and the like occur in the received control information. In a case where it is determined that a drop, an error, and the like occur in the received control information, the controller 280C generates control information including error information and identification information of the projector 200C. In addition, the controller 280C generates an info-frame including the generated control information and identification information of the projector 200A indicating a destination of the control information. The controller 280C adds the generated info-frame to an HDMI signal of a blanking period of image data and transmits the HDMI signal to the projector 200A. The error information corresponds to "result information" according to the invention.

In addition, the controller 280C reduces data amount of image data included in the HDMI signal transmitted to the projector 200A smaller than data amount of image data included in the HDMI signal received from the projector 200B. That is, the controller 280C transmits low volume image data with reduced data amount of the image data included in the HDMI signal received from the projector 200B to the projector 200A. The low volume image data corresponds to "low volume image data" according to the invention. An info-frame is transmitted using three data lines of TMDS channels #0, #1, and #2 of the HDMI cables 21, 22, 23, and 24. According to a standard of HDMI, three data lines of TMDS channels #0, #1, and #2 cannot transmit only control information without transmitting image data. Therefore, the controller 280C generates an HDMI signal including low volume image data smaller than the image data received from the projector 200B and transmits the HDMI signal to the projector 200A. In addition, the controller 280C adds an info-frame to an HDMI signal of a blanking period of the low volume image data and transmits the HDMI signal to the projector 200A. The blanking period of the low volume image data is synchronized with a blanking period of image data transmitted to the projector 200A by the image supply device 100.

As lengths of the HDMI cables 22, 23, and 24 connected between the projectors 200 increase, there is a high possibility that a transmission error or the like will occur. Especially, as a volume of the image data to be transmitted increases, there is a higher possibility that a transmission error will occur. For this reason, since it is not necessary to transmit image data from the projector 200C located at an end to the projector 200A which is a master machine, the controller 280C reduces a volume of the image data and transmits low volume image data such as an image of a single black color to the projector 200A. Accordingly, it is possible to reliably transmit low volume image data and error information to the projector 200A by reducing a probability that a transmission error or the like occurs in the HDMI cable 24.

Figure 3:
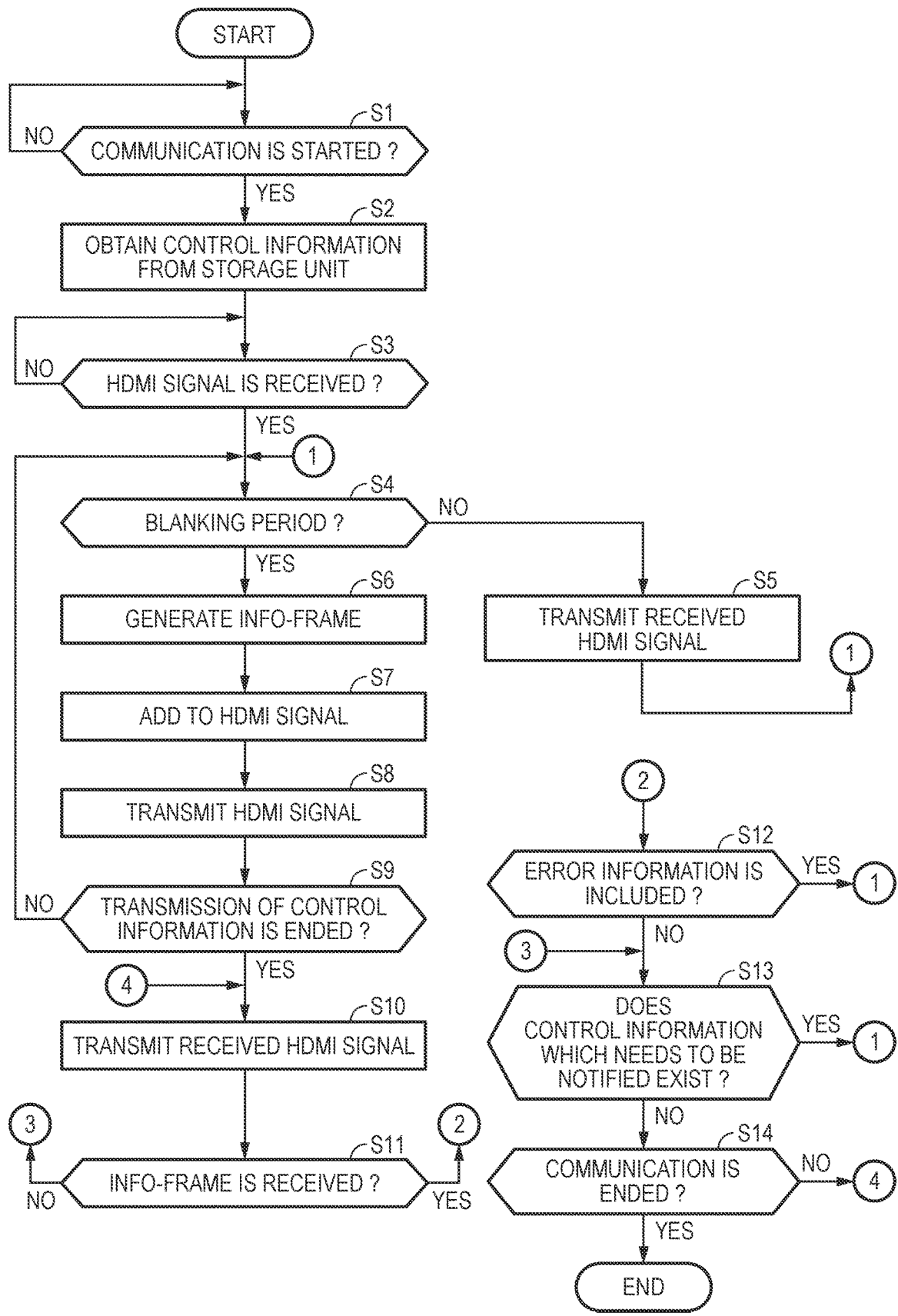
FIG. 3 is a flow chart illustrating operation of the projector.

FIG. 3 is a flow chart illustrating operation of the controller 280A of the projector 200A.

When a communication start command is received from the image supply device 100, the controller 280A determines whether or not communication with the image supply device 100 is started (step S1). In a case of negative determination (NO in step S1), the controller 280A waits until the communication start command is received. In addition, in a case of positive determination (YES in step S1), the controller 280A obtains control information from the storage unit 270A (step S2).

Next, the controller 280A determines whether or not an HDMI signal transmitted from the image supply device 100 is received by the HDMI receiver 252A (step S3). In a case of negative determination (NO in step S3), the controller 280A waits until the HDMI signal is received. In addition, in a case of positive determination (YES in step S3), the HDMI I/F unit 250A converts the HDMI signal received via the HDMI cable 21 into image data, audio data, and control information. The HDMI signal transmitted via the HDMI cable 21 is a differential signal. For this reason, the HDMI I/F unit 250A converts and demodulates the HDMI signal received by the HDMI receiver 252A into image data, audio data, and control information. In addition, the HDMI I/F unit 250A performs a process necessary for the converted image data and audio data, outputs the image data to the image processing unit 260A, and outputs the audio data to the audio processing unit 240A. Further, the HDMI I/F unit 250A outputs the control information to the controller 280A.

In addition, according to control of the controller 280A, the HDMI I/F unit 250A adds an info-frame to the HDMI signal received by the HDMI receiver 252A and transmits the HDMI signal to the projector 200B.

First, the controller 280A determines whether or not the HDMI signal received from the image supply device 100 is an HDMI signal in a blanking period during which transmission of image data is interrupted (step S4). Based on a vertical synchronizing signal or a horizontal synchronizing signal included in the control information input from the HDMI I/F unit 250A, the controller 280A determines the blanking period. The image supply device 100 generates control information including the control information such as the vertical synchronizing signal or the horizontal synchronizing signal, adds an info-frame including the generated control information to the HDMI signal of the blanking period of the image data, and transmits the HDMI signal to the projector 200A.

In a case where it is determined that the HDMI signal is not the HDMI signal of the blanking period (NO in step S4), the controller 280A transmits the HDMI signal received by the HDMI receiver 252A to the projector 200B by the HDMI transmitter 256A (step S5). The HDMI transmitter 256A may transmit the HDMI signal received by the HDMI receiver 252A as it is to the projector 200B and may transmit the HDMI signal to the projector 200B after re-converting the extracted image data, audio data, and control information into the HDMI signal. The controller 280A returns to determination in step S4 and determines whether or not the received HDMI signal is an HDMI signal in a blanking period.

In addition, in a case where it is determined that the HDMI signal is the HDMI signal of the blanking period (YES in step S4), the controller 280A generates an info-frame including control information read from the storage unit 270A or identification information of the projector 200 indicating a destination of the control information. The controller 280A instructs the HDMI I/F unit 250A to add the generated info-frame to the HDMI signal (step S6).

The HDMI transmitter 256A which receives instruction from the controller 280A generates an info-frame including control information (step S7), add the generated info-frame to the HDMI signal, and transmits the HDMI signal to the projector 200B (step S8).

In a case where control information cannot be transmitted in one info-frame, the controller 280A divides the control information into a plurality of info-frames and transmits the info-frames to the projector 200B a plurality of times. In addition, in a case where transmission cannot be performed with an HDMI signal in one blanking period, the HDMI transmitter 256A divides the blanking period into a plurality of blanking periods and transmits the info-frames to the projector 200B a plurality of times.

Next, the controller 280A determines whether or not transmission of control information is ended (step S9). That is, the controller 280A transmits control information of the projector 200B to the projector 200B and determines whether or not control information of the projector 200C is transmitted to the projector 200B. In a case of negative determination (NO in step S9), the controller 280A returns to determination in step S4. The controller 280A determines whether or not the received HDMI signal is an HDMI signal of a blanking period, adds an info-frame to the HDMI signal of the blanking period, and transmits the HDMI signal to the projector 200B.

In addition, in a case where it is determined that transmission of the control information is ended (YES in step S9), the controller 280A accepts the HDMI signal received by the HDMI receiver 252A, processes the HDMI signal by the projector 200A, and transmits the HDMI signal to the projector 200B (step S10). That is, the controller 280A transmits the HDMI signal received from the image supply device 100 as it is to the projector 200B without adding an info-frame to the HDMI signal.

Next, the controller 280A determines whether or not an HDMI signal to which an info-frame is added is received from the projector 200C located at an end of the daisy chain connected projectors (step S11). In a case of negative determination (NO in step S11), the controller 280A moves to a process in step S13.

In addition, in a case of positive determination (YES in step S11), the controller 280A extracts and processes control information from the received info-frame and determines whether or not error information is included in the control information (step S12). In a case of positive determination (YES in step S12), the controller 280A moves to step S4 and transmits again the info-frame including control information read from the storage unit 270A to the projector 200 which transmits the error information. In addition, in a case of negative determination (NO in step S12), the controller 280A determines whether or not another control information which needs to be notified to the projector 200B or 200C occurs (step S13). For example, the projector 200A may transmit position information indicating a display position of a tool image to the projectors 200B and 200C as control information. For example, the tool image is an image in which an icon for setting a line width of a line on which a user draws an image on the screen SC or a plurality of icons such as icons for deleting the drawn image are displayed. When the display position of tool image is changed, the controller 280A transmits position information indicating the changed display position of the tool image to the projectors 200B and 200C as control information.

In a case of positive determination in step S13 (YES in step S13), the controller 280A moves to step S4. For example, the controller 280A generates an info-frame including control information indicating a position of the tool image after a change and identification information of the projector 200 indicating a destination of the control information. The controller 280A adds the generated info-frame to an HDMI signal of a blanking period and transmits the HDMI signal to the projector 200B.

In addition, in a case of negative determination in step S13 (NO in step S13), the controller 280A determines whether or not communication with the image supply device 100 is ended (step S14). In a case of negative determination (NO in step S14), the controller 280A returns to the process in step S10 and transmits the HDMI signal received by the HDMI receiver 252A to the projector 200B (step S10). In addition, in a case of positive determination in step S14 (YES in step S14), the controller 280A ends the process flow.

Figure 4:
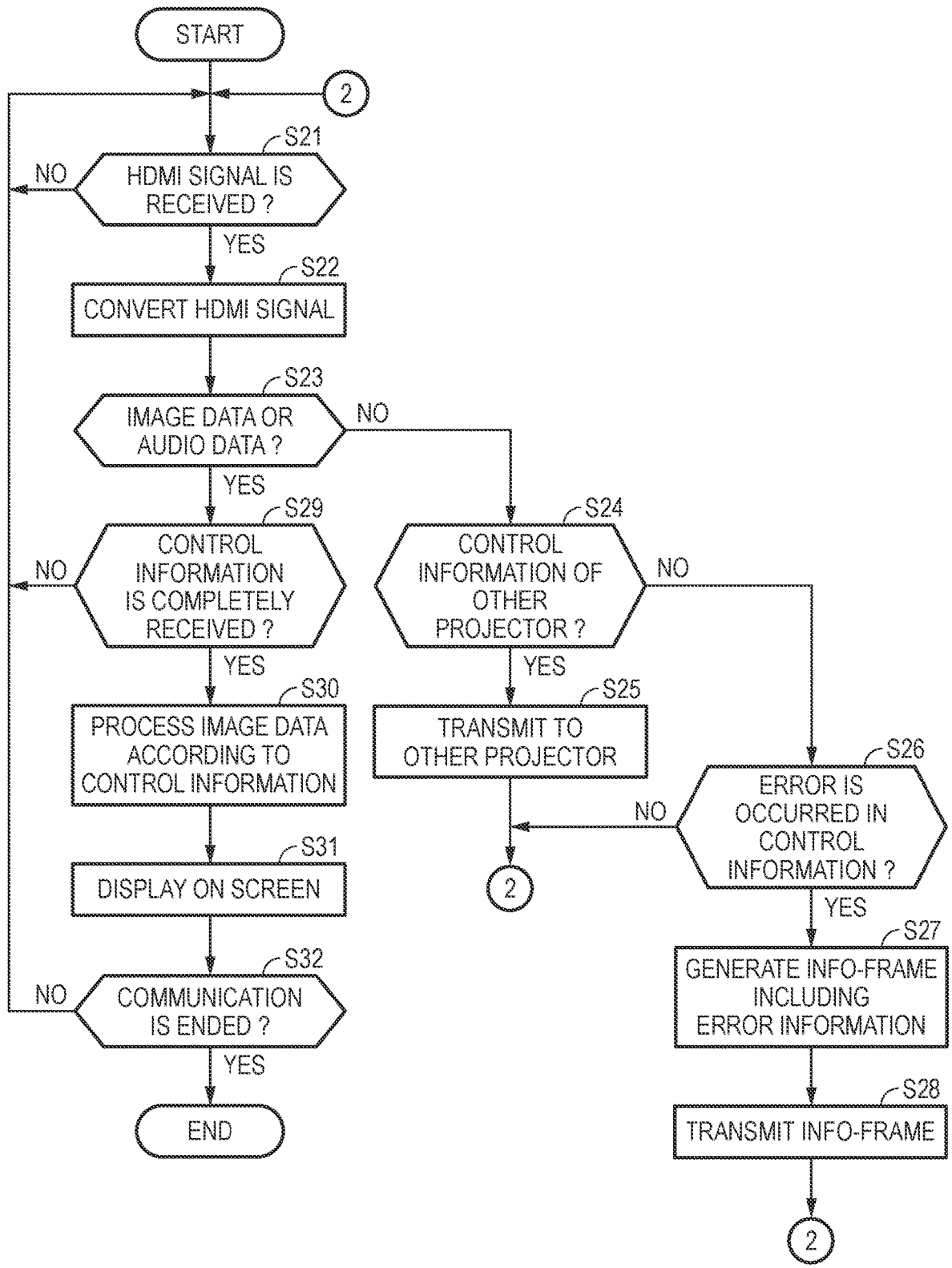
FIG. 4 is a flow chart illustrating operation of the projector.

FIG. 4 is a flow chart illustrating operation of the projector 200C.

The controller 280C determines whether or not an HDMI signal transmitted from the projector 200B is received by the HDMI receiver 254C (step S21). In a case of negative determination (NO in step S21), the controller 280C waits until the HDMI signal is received. In addition, in a case of positive determination (YES in step S21), the HDMI I/F unit 250C converts the HDMI signal received by the HDMI receiver 254C into image data, audio data, and control information.

Next, the controller 280C determines whether or not the received HDMI signal is converted and image data or audio data is obtained (step S23). In a case of negative determination (NO in step S23), the controller 280C determines that data obtained by converting the HDMI signal is control information and determines whether or not the control information is control information addressed to another projector 200 (step S24). In a case of positive determination (YES in step S24), the controller 280C transmits the HDMI signal received by the HDMI receiver 254C to the projector 200A by the HDMI transmitter 256C (step S25). The HDMI transmitter 256C may transmit the HDMI signal received by the HDMI receiver 254C as it is to the projector 200A and may transmit the HDMI signal to the projector 200A after re-converting the extracted control information into the HDMI signal.

In addition, in a case of negative determination in step S24 (NO in step S24), the controller 280C determines that the control information is control information addressed to the projector 200C and determines whether or not a drop, an error, and the like occur in the received control information (step S26). In a case of positive determination (YES in step S26), the controller 280C generates control information including error information and identification information of the projector 200C. In addition, the controller 280C generates an info-frame including the generated control information and identification information of the projector 200A indicating a destination of the control information (step S27). The controller 280C adds the generated info-frame to an HDMI signal of a blanking period of image data and transmits the HDMI signal to the projector 200A (step S28). In addition, in a case of negative determination in step S26 (NO in step S26), the controller 280C returns to step S21 and receives the HDMI signal (step S21).

In addition, in a case of positive determination in step S23 (YES in step S23), the controller 280C determines whether or not control information such as a parameter used for image range information or a blending process is control information completely received from the projector 200A (step S29). In a case of negative determination (NO in step S29), the controller 280C moves to the process in step S21 and continues to receive an HDMI signal. In addition, in a case of positive determination (YES in step S29), the controller 280C causes the image processing unit 260C to process image data according to the control information (step S30). That is, based on image range information included in the control information, the controller 280C separates the image data received from the projector 200B. That is, the controller 280C extracts image data corresponding to an image portion projected by the projector 200C from the image data received from the projector 200B. The controller 280C develops the extracted image data to a frame memory 265C and performs a process to the developed image data. In addition, the controller 280C notifies a parameter included in the control information to the image processing unit 260C and the image processing unit 260C performs a blending process to the image data using the parameter notified from the controller 280C.

When the image process is ended, the image processing unit 260C read image data from the frame memory 265C and outputs the image data to a light modulation device driving unit 222C. The light modulation device driving unit 222C converts the input image data into a data signal suitable for operation of a liquid crystal panel, applies a voltage to each of pixels of each of liquid crystal panels and draws the image on each of the liquid crystal panels based on the converted data signal. Accordingly, an image to be projected by the projector 200C is projected on the projection area 10C of the screen SC (step S31).

Next, the controller 280C determines whether or not communication with the projector 200B is ended (step S32). In a case of negative determination (NO in step S32), the controller 280C returns to step S21 and continues to receive an HDMI signal. In a case of positive determination (YES in step S32), the controller 280C ends the process flow.

The present embodiment described above is the projection system 1 including the projector 200A and the projectors 200B and 200C which are slave machines. The projector 200A and the projector 200B are connected with each other by a daisy chain method via the HDMI cable 22. The projector 200B and the projector 200C are connected with each other by a daisy chain method via the HDMI cable 23. The HDMI cables 22 and 23 have three data lines of TMDS channels #0, #1, and #2 for transmitting image data.

The projector 200A transmits control information which controls the projector 200B or 200C to the projector 200B along with image data via a data line of the HDMI cable 22. In a case where the control information is control information addressed to the projector 200B, the projector 200B extracts and processes the control information input from the HDMI cable 22. In addition, in a case where the control information is control information addressed to the projector 200C, the projector 200B transmits the control information to the projector 200C along with image data via a data line of the HDMI cable 23. In a case where the control information is control information addressed to the projector 200C, the projector 200C extracts and processes the control information input from the HDMI cable 23.

Accordingly, it is possible to transmit image data and control information from the projector 200A to the projector 200B or 200C even if there is a simple connection configuration in which the projectors 200A, 200B, and 200C are connected to each other by the HDMI cables 22 and 23.

In addition, among the projectors 200B and 200C connected to the projector 200A by a daisy chain method, the projector 200C located at an end is connected with the projector 200A by the HDMI cable 24.

Accordingly, the projector 200C can output control information to the projector 200A.

In addition, the HDMI cable 24 has three data lines of TMDS channels #0, #1, and #2 for transmitting image data. The projector 200C outputs control information to a data line of the HDMI cable 24 and the projector 200A extracts and processes the control information input from the HDMI cable 24.

Accordingly, it is possible to transmit image data and control information from the projector 200C to the projector 200A via the data line of the HDMI cable 24.

In addition, identification information for identifying the projectors 200 is set to each of the projectors 200A, 200B, and 200C. The projector 200A outputs control information to the data line of the HDMI cable 22 along with identification information of a destination projector. Among the control information input from the HDMI cable 22, the projector 200B executes a process corresponding to control information including the set identification information and outputs result information indicating a result of the executed process to the HDMI cable 23. Accordingly, among the control information input from the data line of the HDMI cable 22, the projector 200B can execute a process corresponding to control information including the set identification information. In addition, it is possible to cause the projector 200B to output the result information indicating the result of the executed process to the data line of the HDMI cable 23.

In addition, the projector 200C outputs the result information output to the data line of the HDMI cable 23 by the projector 200B to the data line of the HDMI cable 24. Accordingly, it is possible to output result information of a process corresponding to control information of the projector 200B to the projector 200A.

In addition, the projector 200C outputs low volume image data with reduced data amount of image data input from the data line of the HDMI cable 23 and result information to the data line of the HDMI cable 24. Accordingly, it is possible to reliably transmit low volume image data and result information to the projector 200A by reducing a probability that a transmission error or the like occurs in the HDMI cable 24.

In addition, the projector 200A outputs control information to the data line of the HDMI cable 22 by including the control information in an info-frame of an HDMI protocol. The projector 200B outputs the control information received via the data line of the HDMI cable 22 to the data line of the HDMI cable 23 by including the control information in an info-frame of an HDMI protocol.

Accordingly, it is possible to transmit control information by data lines of the HDMI cables 22 and 23 without changing an existing HDMI protocol.

In addition, the control information output by the projector 200A includes at least one of setting information for setting a position of an image projected by each of the projectors 200B and 200C for a tiling image and setting information related to an edge blending process to the overlapping areas 11 and 12 in which images are overlapped each other for a tiling image. Accordingly, the projectors 200B and 200C can set a position of an image to be projected and can perform a setting related to an edge blending process by extracting control information input from the data line of the HDMI cable 22 or 23.

In addition, the projector 200A operates as a control device which transmits control information to the projectors 200B and 200C. Accordingly, it is possible to operate a projector of a projection system as a control device without separately preparing a device operated as the projector 200A.

The embodiment described above is merely an example of a specific embodiment to which the invention is applied and does not limit the invention. The invention can be applied as a different embodiment.

For example, in the embodiment described above, a case where the projector 200A is operated as a control device is described, but the image supply device 100 may be operated as a control device and the projectors 200A, 200B, and 200C may be operated by control of the image supply device 100. In this case, the image supply device 100 is connected with the projector 200C located at an end by the HDMI cable 24 which is a loop cable.

In addition, as an interface included in the image supply device 100 and the projector 200 described above, an interface conforming to a display port standard can be used and as a cable, a display port cable can be used.

In addition, the embodiment described above is an example of a configuration in which the light modulation device 212A includes a liquid crystal panel. The liquid crystal panel may be a transmission-type liquid crystal panel or a reflective type liquid crystal panel. In addition, the light modulation device 212A may use a digital mirror device (DMD) instead of the liquid crystal panel. Further, the digital mirror device and a color wheel may be combined. In addition, the light modulation device 212A may adopt a configuration which can modulate light emitted from a light source in addition to the liquid crystal panel and the DMD.

In addition, each of function units of the projector 200A illustrated in FIG. 2 indicates a function configuration, and a specific implementation embodiment is not particularly limited thereto. That is, it is not necessary to implement hardware corresponding to each of the function units individually, but it is also possible to realize a configuration in which functions of a plurality of function units are realized by a program executed by one processor. In addition, a part of the functions realized by software in the embodiment described above may be realized by hardware and another part of the functions realized by hardware may be realized by software. Further, specific details of the other parts of the projector can be changed arbitrarily without departing from spirit of the invention.

In addition, processing units of the flowcharts illustrated in FIGS. 3 and 4 are divided according to main processing contents so as to make the processes of the controllers 280A and 280C of the projectors 200A and 200C easy to understand. A method or a name of division of the processing units illustrated in the flowcharts of FIGS. 3 and 4 does not limit the invention. In addition, the processes of the controllers 280A and 280C can be divided into more processing units according to the processing content or can be divided so that one processing unit includes more processes. Further, a processing order of the flowcharts described above is not limited to the illustrated example.

What is claimed is:

1. A projection system comprising:
a control device; and
a plurality of projectors, wherein
the control device and the projectors, and each of the projectors, are connected by a daisy chain method via a plurality of cables forming a daisy chain,
each cable has a data line which transmits image data,
the control device outputs control information which controls the projectors to the projectors via each data line along with the image data,
the projectors extract and process the control information input from each data line of each cable,
the projector located at an end of the daisy chain furthest from the control device among the plurality of projectors is connected to the control device by a loop cable,
the loop cable has a data line which transmits image data,
the projector located at the end of the daisy chain outputs the control information to the data line of the loop cable, and
the control device extracts and processes the control information input from the data line of the loop cable.

2. The projection system according to claim 1, wherein identification information which identifies each projector is set to each of the projectors,
the control device outputs the control information to each cable along with the identification information of a destination projector among the plurality of projectors, and
the projectors execute a process corresponding to the control information including the set identification information among the control information input from the cables and output result information indicating a result of the executed process to the data lines of the cables and the data line of the loop cable.

3. The projection system according to claim 2, wherein the projector located at the end of the daisy chain outputs the result information output to the respective cable by the other projector to the data line of the loop cable.

4. The projection system according to claim 2, wherein the projector located at the end of the daisy chain outputs low volume image data with a reduced data amount of the image data input from the respective cable and the result information to the data line of the loop cable.

5. The projection system according to claim 1, wherein each of the cables and the loop cable is an HDMI (registered trademark) cable, and
the control device and each projector output the control information included in an info-frame of an HDMI protocol to the data lines of the cables and the data line of the loop cable.

6. The projection system according to claim 1, wherein a tiling image is projected by superimposing images projected by the plurality of the projectors on a projection surface, and
the control information output by the control device includes at least one of setting information for setting a position of an image projected by each of the projectors for the tiling image and setting information related to an edge blending process to an overlapping area in which the images overlap each other for the tiling image.

7. The projection system according to claim 1, wherein the control device is one of the plurality of projectors which projects an image.

8. The projection system according to claim 1, wherein the image data transmitted by the data line of each cable and by the data line of the loop cable is image data corresponding to each of primary colors R, G and B.

9. A control device constituting a projection system along with a plurality of projectors, wherein
the control device and the projectors, and each of the projectors, are connected by a daisy chain method via a plurality of cables forming a daisy chain, each cable having a data line which transmits image data,
the control device comprising:
a transmitter which outputs control information which controls the projectors to the projectors via each data line along with the image data,
the projectors extract and process the control information input from each data line of each cable,
the projector located at an end of the daisy chain furthest from the control device among the plurality of projectors is connected to the control device by a loop cable,
the loop cable has a data line which transmits image data,
the projector located at the end of the daisy chain outputs the control information to the data line of the loop cable, and
the control device extracts and processes the control information input from the data line of the loop cable.

10. The control device according to claim 9, wherein the image data transmitted by the data line of each cable and by the data line of the loop cable is image data corresponding to each of primary colors R, G and B.

11. A control method of a projection system comprising a control device and a plurality of projectors, wherein
the control device and the projectors, and each of the projectors, are connected by a daisy chain method via a plurality of cables forming a daisy chain,
each cable has a data line which transmits image data,
the control device outputs control information which controls the projectors to the projectors via each data line along with the image data,
the projectors extract and process the control information input from each data line of each cable,
the projector located at an end of the daisy chain furthest from the control device among the plurality of projectors is connected to the control device by a loop cable,
the loop cable has a data line which transmits image data,
the projector located at the end of the daisy chain outputs the control information to the data line of the loop cable, and
the control device extracts and processes the control information input from the data line of the loop cable.

12. The control method according to claim 11, wherein the image data transmitted by the data line of each cable and by the data line of the loop cable is image data corresponding to each of primary colors R, G and B.

* * * * *